(12) United States Patent
Burk (10) Patent No.: US 9,058,088 B2
(45) Date of Patent: Jun. 16, 2015

(54) METHODS AND SYSTEMS FOR OPERATING A REMOTE COMPUTER APPLICATION FROM A THIN CLIENT

(75) Inventor: Hans-Peter Burk, Ludwigsburg (DE)

(73) Assignee: Libera, Inc., Jamestown, NY (US)

( * ) Notice: Subject to any disclaimer, the term of this patent is extended or adjusted under 35 U.S.C. 154(b) by 325 days.

(21) Appl. No.: 13/189,359

(22) Filed: Jul. 22, 2011

(65) Prior Publication Data

US 2012/0192079 A1    Jul. 26, 2012

Related U.S. Application Data (60) Provisional application No. 61/400,155, filed on Jul. 23, 2010.

(51) Int. Cl.
| | | |
|---|---|---|
| *G06F 3/01* | (2006.01) | |
| *G06F 3/0481* | (2013.01) | |
| *G06F 9/54* | (2006.01) | |
| *H04L 29/08* | (2006.01) | |

(52) U.S. Cl.
CPC ........... *G06F 3/0481* (2013.01); *H04L 29/0872* (2013.01); *G06F 9/54* (2013.01); *G06F 2203/04803* (2013.01); *G06F 2209/549* (2013.01)

(58) Field of Classification Search
CPC .......................... G06F 3/0481; H04L 29/0872
USPC ................... 715/740; 709/202, 203, 217–219
See application file for complete search history.

(56) References Cited

U.S. PATENT DOCUMENTS

| | | | |
|---|---|---|---|
| 6,032,137 A * | 2/2000 | Ballard | 705/75 |
| 6,295,551 B1 * | 9/2001 | Roberts et al. | 709/205 |
| 6,345,279 B1 * | 2/2002 | Li et al. | 1/1 |
| 8,307,119 B2 * | 11/2012 | Rochelle et al. | 709/248 |
| 8,341,732 B2 * | 12/2012 | Croft et al. | 726/21 |
| 2003/0069923 A1 * | 4/2003 | Peart | 709/203 |
| 2003/0191799 A1 * | 10/2003 | Araujo et al. | 709/203 |
| 2006/0265662 A1 * | 11/2006 | Gertzen | 715/760 |
| 2007/0180450 A1 * | 8/2007 | Croft et al. | 718/1 |
| 2007/0186212 A1 * | 8/2007 | Mazzaferri et al. | 718/1 |
| 2007/0219956 A1 * | 9/2007 | Milton | 707/3 |
| 2007/0233811 A1 * | 10/2007 | Rochelle et al. | 709/219 |
| 2009/0320073 A1 * | 12/2009 | Reisman | 725/51 |
| 2011/0138295 A1 * | 6/2011 | Momchilov et al. | 715/740 |
| 2011/0197141 A1 * | 8/2011 | Mazzaferri | 715/740 |

* cited by examiner

*Primary Examiner* — Anil Bhargava
(74) *Attorney, Agent, or Firm* — Baker & Hostetler LLP (57) ABSTRACT

Methods and systems are provided for overcoming negative tradeoffs associated with providing remote access to a computer application, such as lack of control over functions of the computer application. Such tradeoffs are overcome by controlling the functions of the computer application provided to a thin client. The functions are controlled by an executable that displays a modified image of a session of the computer application. Specifically, the executable hides particular elements of the session and the limited image is then the image that is provided to a client, as opposed to the client accessing the full functionality of the computer application via remote computing.

19 Claims, 6 Drawing Sheets

FIG. 6

METHODS AND SYSTEMS FOR OPERATING A REMOTE COMPUTER APPLICATION FROM A THIN CLIENT

CROSS REFERENCE TO RELATED APPLICATION

The present application claims priority to U.S. Provisional Patent Application No. 61/400,155, filed Jul. 23, 2010. The contents of that application are hereby incorporated by reference.

TECHNICAL FIELD

The invention relates to remote access of a computer application from a thin client. Specifically, the invention relates to using remote access functionality to develop new applications without having to recreate the components and functions of robust remote applications and to using such functionality to modify and control existing remote applications provided to end users.

BACKGROUND

The advent of client-server based networking combined with the need for organizations to cut costs in IT support has encouraged adoption of remote desktop software. Remote desktop software facilitates a remote server or a cluster of servers to store and execute a computer application that users can access via a thin client that is connected to the remote server or the cluster through a computer network. Such a practice facilitates end users to access a fully functional computer application remotely and it also facilitates administration of the computer application from the server or the cluster as opposed to administration from each client computer. Another benefit includes clients having various operating systems that are able to interface the computer application without concern for compatibility issues. Compatibility with various operating systems is not a concern because the user of the thin client interacts with a copy of an image of a session of the computer application as opposed to interacting directly with the computer application.

From its name, it may be assumed that remote desktop software only facilitates remote interaction with a desktop session hosted on a remote computer; however, it has become popular to configure remote desktop software to facilitate interaction with a single computer application. For example, a user through a client computer could interact with a copy of an image of a MICROSOFT WORD™ or a MICROSOFT EXCEL™ session that is hosted on a remote computer.

As mentioned above, remote desktop software allows for interacting with the full functionality of a remote computer application, but it does not additionally allow for developing a new application using specific components and functions of the remote computer application nor does it allow modifying and controlling the use of the remote computer application in a granular manner. To address these limitations, systems and methods are described herein that allow end users to use specific components and functions of a remote computer application to develop their own applications, where the remote application acts as a virtual library at the developers' disposal. Additionally, the methods and systems described herein allow for overcoming a well know tradeoff associated with remote desktop computing, which is having less control over functionality provided by a remote application session and the content entered into files interacting with the remote application.

SUMMARY

The invention facilitates using remote applications and their components and functions as application programming interfaces and libraries for developing new applications. The methods and systems of the invention particularly lend themselves to the development of applications compatible with thin clients. By providing such functionality, developers can take advantage of the components and functions provided by a wide array of computer applications, such as MICROSOFT WORD™ and MICROSOFT EXCEL™, when developing their own applications. Additionally, the methods and systems overcome the above-mentioned tradeoffs of remote desktop computing which is a lack of control over the functionality of a function-rich computer application and the files interacting with such an application.

The methods and systems of the invention provide the aforementioned functionality by employing a combination of interacting technologies that facilitate interacting with the function-rich application, making the function-rich application provided to an end-user via a client computer behave more like a lightweight client side application. This allows for the end user to interact with the remote application independently or as a part of a greater application where a number of the components or functions of the greater application are derived from the remote application.

Such functionality is provided by controlling selected aspects of the computer application provided to a thin client. The aspects are controlled by an executable that displays a modified image of the session of the computer application. Specifically, the executable hides particular elements of the session. This limited image is then the image that is provided to an end-user as opposed to the end-user accessing the full functionality of the computer application via remote computing.

In an embodiment of the invention, remote desktop software, a web application server that hosts a web application, and the executable (e.g. a.out, COFF, COM, ELF, Mach-O, MZ, NE, OMF, PE (exe), PEF, etc.) facilitate the limited application session provided to the end-user. The web application provides a user interface to the thin client, where the user interface includes two user interface components. The first user interface component outputs a copy of the image of the computer application session, where the computer application session may be a session of a word processor, a database management system, a presentation program, a spreadsheet program, an email and personal information management system, or the like, or any combination thereof. The second user interface component outputs a tool (e.g. toolbar, menu, items of a toolbar or menu, etc.) for interacting with the first user interface component. The executable facilitates restricting or hiding particular elements of the image of the application session so that the particular elements do not appear in the copy of the image. By hiding the elements, the thin client does not have access to all the functions of a function-rich application through the copy of the image. However, a number of the hidden functions are found in the second user interface component. From the second user interface, functions that interact with the computer application can be controlled to a greater extent than if accessed directly through the copy of the image. As a result, developers can take advantage of the components and functions provided by a wide array of computer applications, such as MICROSOFT WORD™ and MICROSOFT EXCEL™, when developing their own applications and the tradeoffs associated with providing remote access to a computer application session is lessened.

DETAILED DESCRIPTION OF ILLUSTRATIVE EMBODIMENTS

Figure 2:
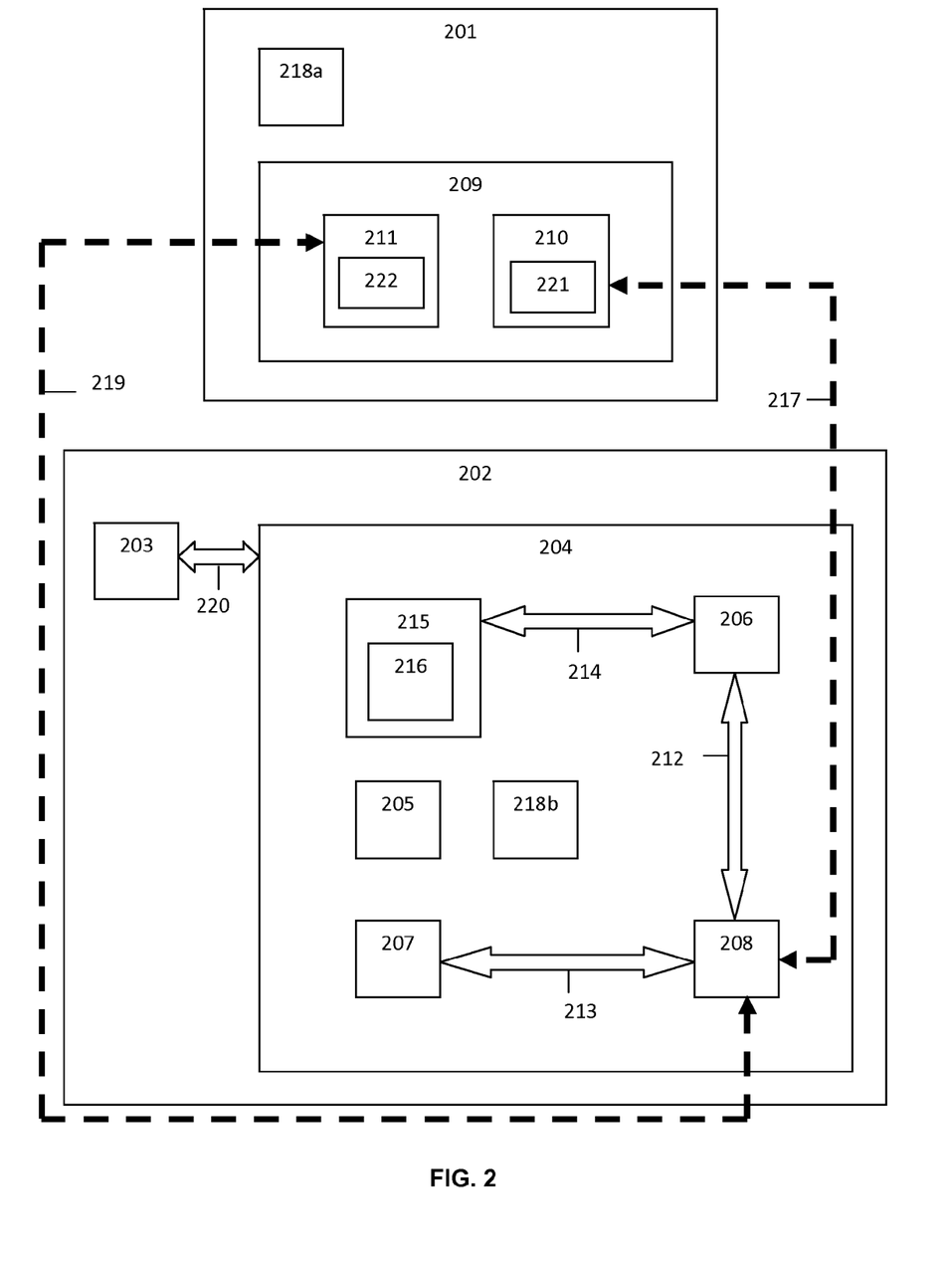
FIGS. 2 and 3 illustrate block diagrams of example computer systems for implementing embodiments of the invention.
Figure 3:
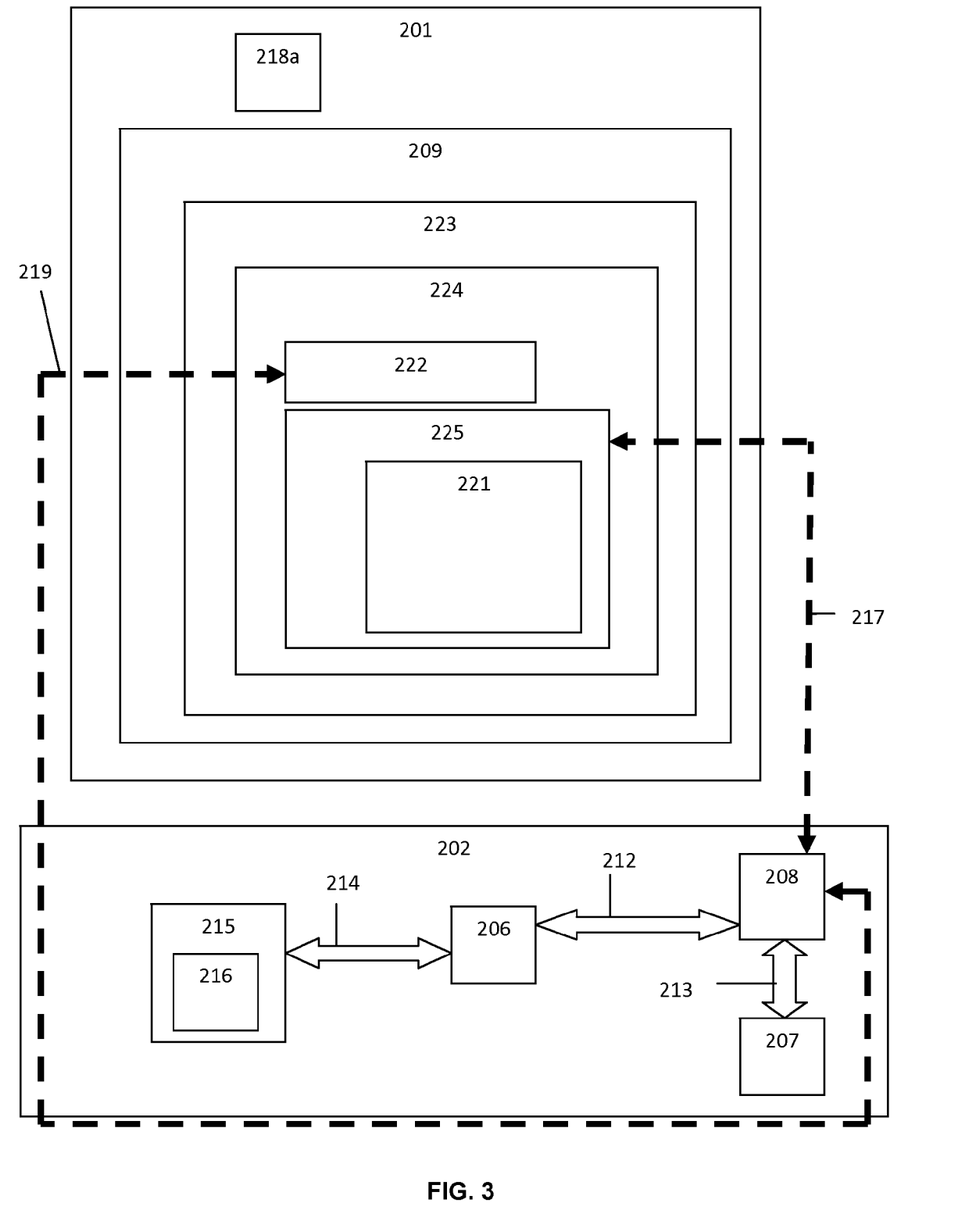

FIGS. 2 and 3 illustrate example embodiments of computer systems for implementing embodiments of the invention. As illustrated, the computer systems have at least one thin client 201 and at least one server 202 having a processor 203 coupled via connections 220 to memory 204 and configured to execute computer-executable instructions stored in the memory 204. The computer-executable instructions specify an operating system 205, a computer application 206, a web application 207, an executable 208, and remote desktop software 218a and 218b. FIGS. 2 and 3 also include a client user interface 209 generated by the web application 207 and outputted by the thin client 201 that includes at least two user interface components 210, 211, 222, and 225. The first user interface component 210 includes a copy 221 of an image of the file user interface 216 provided by the computer application 206. The second user interface component 211 includes at least one tool 222, such as a toolbar, menu, or individual items of a toolbar or menu. The tool or tools 222 possibly include a component that originates from a user interface component of the computer application 206; however, in such a case, the tool or tools 222 are ultimately provided to the thin client 201 through of the web application 207, which may embed limitations on the tool or tools 222.

Preferably, the client user interface 209 of the thin client 201 is provided through a web browser 223 that displays a web page 224. In such a case, it is preferred that the first user interface component 210 is an embedded element, such as an element embedded in an inline frame (e.g. iframe) 225. Whether the thin client 201 is provided through a web browser or not, the second user interface 211 provides additional user interaction capabilities with the session of the computer application 206, the file 215, or any combination thereof. The possible tool or tools 222 of the second user interface 211 include functions that are rendered and controlled by the web application 207, the executable 208, or a combination thereof.

When the processor 203 performs the computer-executable instructions stored in the memory 204, the aforementioned elements of the computer system are able to communicate with each other through at least five communication pathways. The remote desktop software 218a and 218b facilitates such pathways. It is preferred that the communications between the elements occur via virtual channels.

The communication pathways are enabled by at least five connections 212, 213, 214, 217, and 219. The connection may include, for example, remote control software in I-frames that talk to a Citrix or terminal server application with an application that talks to the API of MICROSOFT WORD™ and MICROSOFT EXCEL™ to control it and pass the keys back again. In the illustrated embodiment, the first connection 212 provides a bidirectional communication pathway for the executable 208 and the computer application 206. Preferably, a binary-interface standard for software components (e.g. Common Object Model otherwise known as COM) facilitates the communication between the executable 208 and the computer application 206. COM or any standard similar to COM possibly facilitates any of the other interactions between components of the system as well. The second connection 213 provides a communication pathway for the executable 208 and the web application 207 to communicate bidirectionally. It is preferred for a set of communication and application protocols and services that provide support for a packet-switched network, such as web services, enterprise services, etc., facilitate the communication between the executable 208, the computer application 206, the web application 207, and other systems and servers including enterprise application servers, web application servers, digital asset management systems, database management systems, and the like. The third connection 214 provides a communication pathway for the computer application 206 and a file 215, such as a document, where the file 215 includes a user interface 216 and the file 215 is in a format compatible with the computer application 206. Using the pathway of the third connection 214, the operating system 205 provides control and management for the computer application 206 to read data from and write data to the file 215. The fourth connection 217 provides a communication pathway for the first user interface component 210 and the executable 208, where the fourth connection 217 is facilitated by remote desktop software 218a and 218b. Besides facilitating the fourth connection 217, the remote desktop software 218a and 218b possibly facilitates any connection between elements of the methods and systems. The fifth connection 219 provides a communication pathway for the second user interface component 211 and the web application 207 via the executable 208, where the fifth connection 219 is facilitated by Internet Protocol technologies. Additionally, the operating system 205 further facilitates bidirectional communications within the fourth and fifth connections 217 and 219 and possibly other connections of the system.

In an embodiment of the invention, a cross-platform and language-independent standard for representing and interacting with objects in a document (e.g. Document Object Model otherwise known as "DOM") facilitates communication between the first user interface component 210 and the file 215 via the executable 208. DOM also facilitates interactions between the computer application 206, computer applications of external computer systems, and documents compatible with such applications. Additionally, DOM facilitates the indirect communications between the second user interface component 211 and the file 215 where the file 215 is a document, spreadsheet, or other type of file compatible with DOM.

Figure 1:
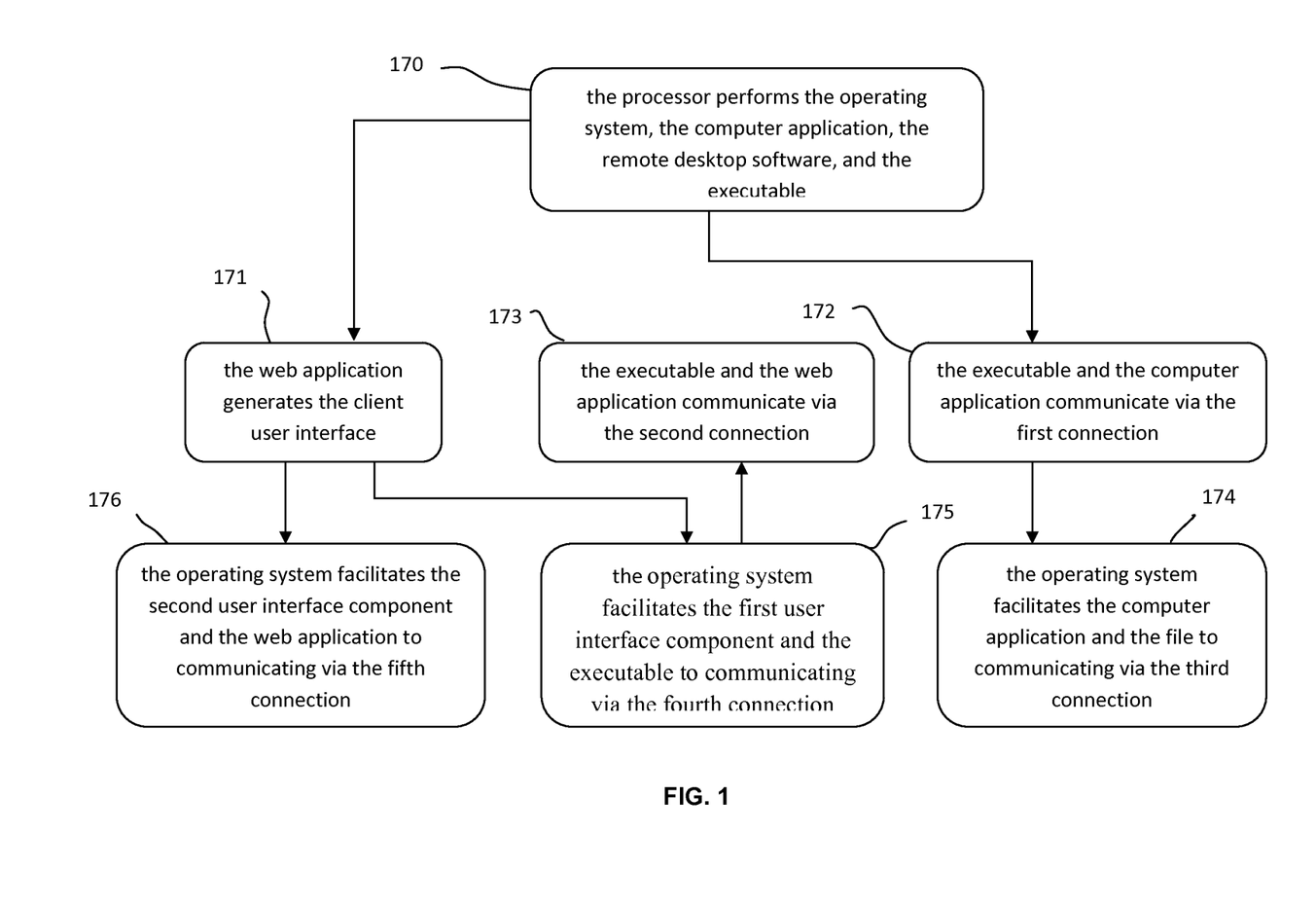
FIG. 1 illustrates a process diagram of an example embodiment of the invention.

In an exemplary embodiment of the invention, upon performance of an operating system, a computer application, a web application, and an executable, a process as shown in FIG. 1 ensues. The process as illustrated in FIG. 1 facilitates limiting user interactions with the computer application to interactions solely through a first user interface component and a second user interface component, which controls functionality of a computer application provided to end-users and content entered into files interacting with the computer application. The process begins with a processor executing the operating system, the computer program, the web application, the remote desktop software, and the executable at 170. As a result, the web application generates a client user interface having the two user interface components at 171. The five above-mentioned connections that facilitate communication amongst the components of the system are enabled at steps 172, 173, 174, 175, and 176. Alternatively, the connections are enabled independently prior or post the aforementioned execution of the components. With the above-mentioned elements interacting through the five connections, a user is only allowed to use the computer application to the extent permitted by the first and second user interface components, instead of directly interfacing with the computer application remotely.

Figure 4:
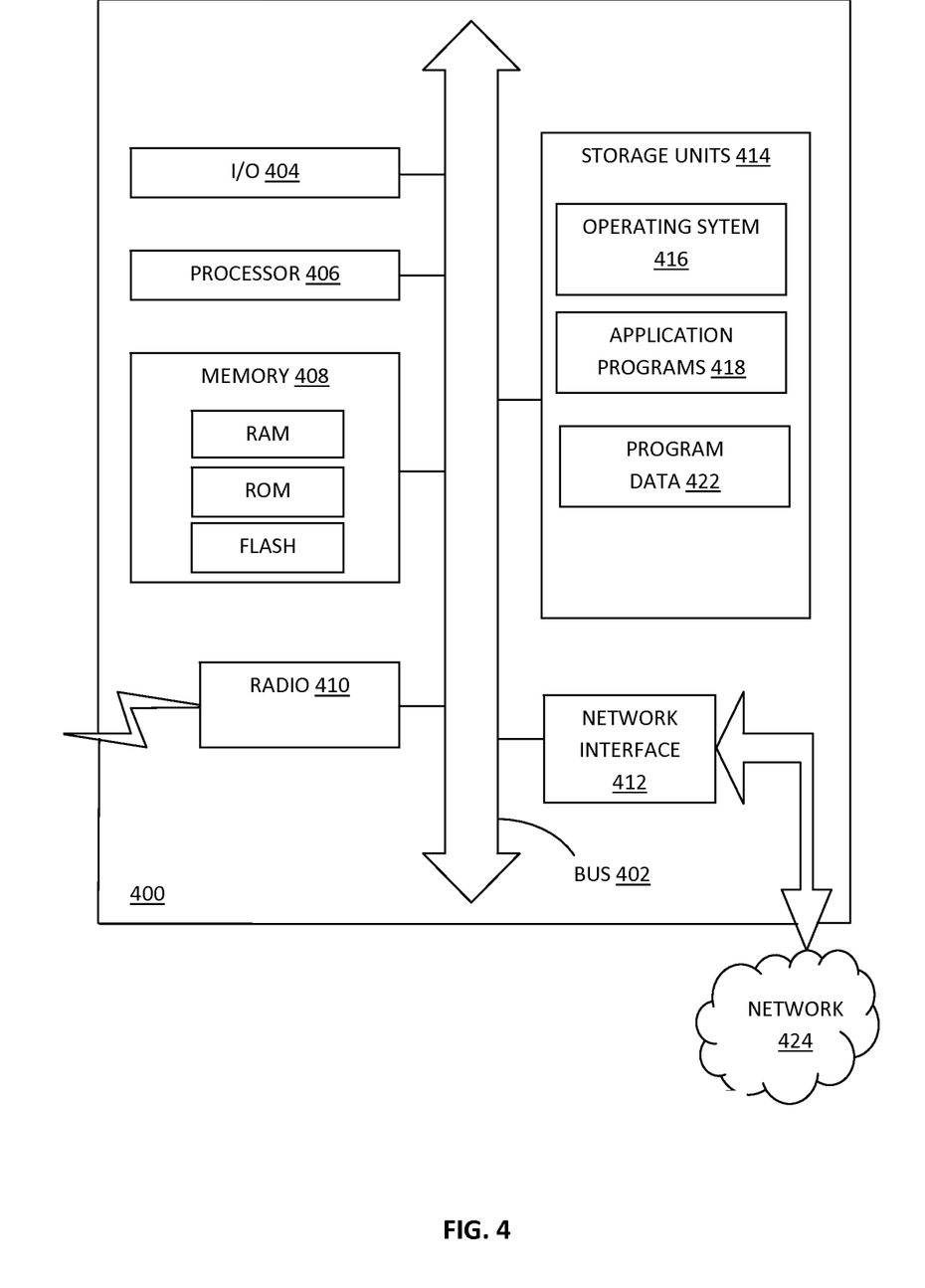
FIG. 4 illustrates a block diagram of an example computer system for enabling embodiments of the computer systems illustrated in FIGS. 2 and 3.

In an embodiment of the invention, the computer systems depicted by FIGS. 2 and 3 are enabled by the computer system depicted in FIG. 4. The computer system illustrated in FIG. 4 includes at least one computer 400 with the facility to run the computer programs of the computer systems depicted in FIGS. 2 and 3, including the operating system 416 and the computer application programs 418. The computer 400 also includes a processor 406 in communication with a computer readable storage medium, where the computer readable storage medium is any medium that that stores information for retrieval later by the processor 406. Computer readable storage medium includes, for example, memory 408 and data storage units 414. The memory 408 is possibly a fast-access memory and is used to run program instructions executable by the processor 406. The memory 408 is possibly random access memory (RAM), read only memory (ROM), and/or flash memory. The data storage units 414 are possibly physical devices and are used to store any data and instructions which may be accessed by the processor 406, such as program data 422 and instructions for computer applications 418 and operating system 416. The data storage units 414 and their associated computer readable storage media provide storage of computer readable instructions, data structures, program modules, and other data for the computer 400. The data storage units 414 are possibly an optical medium, a magnetic medium such as a floppy disk, a compact disc (CD), a digital video disk (DVD), and/or a solid-state medium such as RAM, ROM, and flash memory.

The operating system 416 provides management and allocation of processes and components of the computer system and computer applications 418, where a computer application is defined as any computer program that assists a user to perform a task or multiple related tasks. The computer applications 418 preferably include an executable, a web server that hosts a web application, remote desktop software, a word processor, a database management system, a presentation program, a spreadsheet program, an email and personal information management system, and/or any combination thereof. In one embodiment, the computer applications possibly include a version of MICROSOFT WORD™, MICROSOFT EXCEL™, or MICROSOFT POWERPOINT™. The executable is a file that causes a computer system to perform tasks as opposed to a file that solely carries data. For the purposes of this disclosure, the executable is a program that specifically provides for control over other computer applications. The web application is hosted on a web application server, which is communicated over a computer network and accessed through a web browser. As mentioned above, remote desktop software typically facilitates graphical computer applications to run remotely on a server, while being displayed locally on a client computer. The remote desktop software also facilitates remote use of computer applications that are not necessarily graphical, where the remote use may not necessarily be implemented by a computer (i.e. the thin client is not necessarily a computer). For example, the thin client is possibly a tactile input/output module (e.g. a module based on Braille), a speaker, a microphone, a joystick, the like, or any combination thereof.

The computer 400 operates in a networked environment using logical connections to other computers and communication devices via a network 424. The computer 400, other computers, and communication devices are possibly a personal computer, a server, a router, a network PC, a peer device, or other common network nodes. When used in a LAN or WLAN networking environment, the computer 400 is connected to other computers and communication devices via the LAN or WLAN through a network interface 412. Preferably, the network interface 412 includes a network interface controller (e.g. NIC, wireless network interface controller or card otherwise known as WNIC, etc.). The computer 400 further includes a radio 410 or another type of communications device for wirelessly transmitting and receiving data from other electronic devices.

To interact and communicate with the computer 400 remotely or locally, the computer 400 includes input/output devices 404. The input devices 404 provide input to the processor 406, the memory 408, the radio 410, the storage units 414, the network interface 412, and other electrical components of the computer 400. The output devices 404 provide output of the electrical components of the computer 400 to other electrical components of the computer 400, other electrical components of other electrical devices, or a user of the computer 400 or other electrical devices. Output of information to users is provided in a visual manner, an auditory manner, a tactile manner, any other perceivable manner, or any combination thereof. For example, a display device and speakers typically provide audio and video output to a user. A bus 402 and other circuitry assist in connecting the input/output devices 404 and other electrical components of the computer 400 to each other.

The electrical components of the computer system and other electronic devices, including the bus 402 and other circuitry, are made up of computer hardware, software, firmware, or any combination thereof. The communications amongst such electrical components occur in the form of signals including electronic signals, electromagnetic signals, optical signals, or any combination thereof. The signals are transported through channels, where the channels may be wired, wireless, virtual (virtual channels), the like, or any combination thereof.

Figure 5:
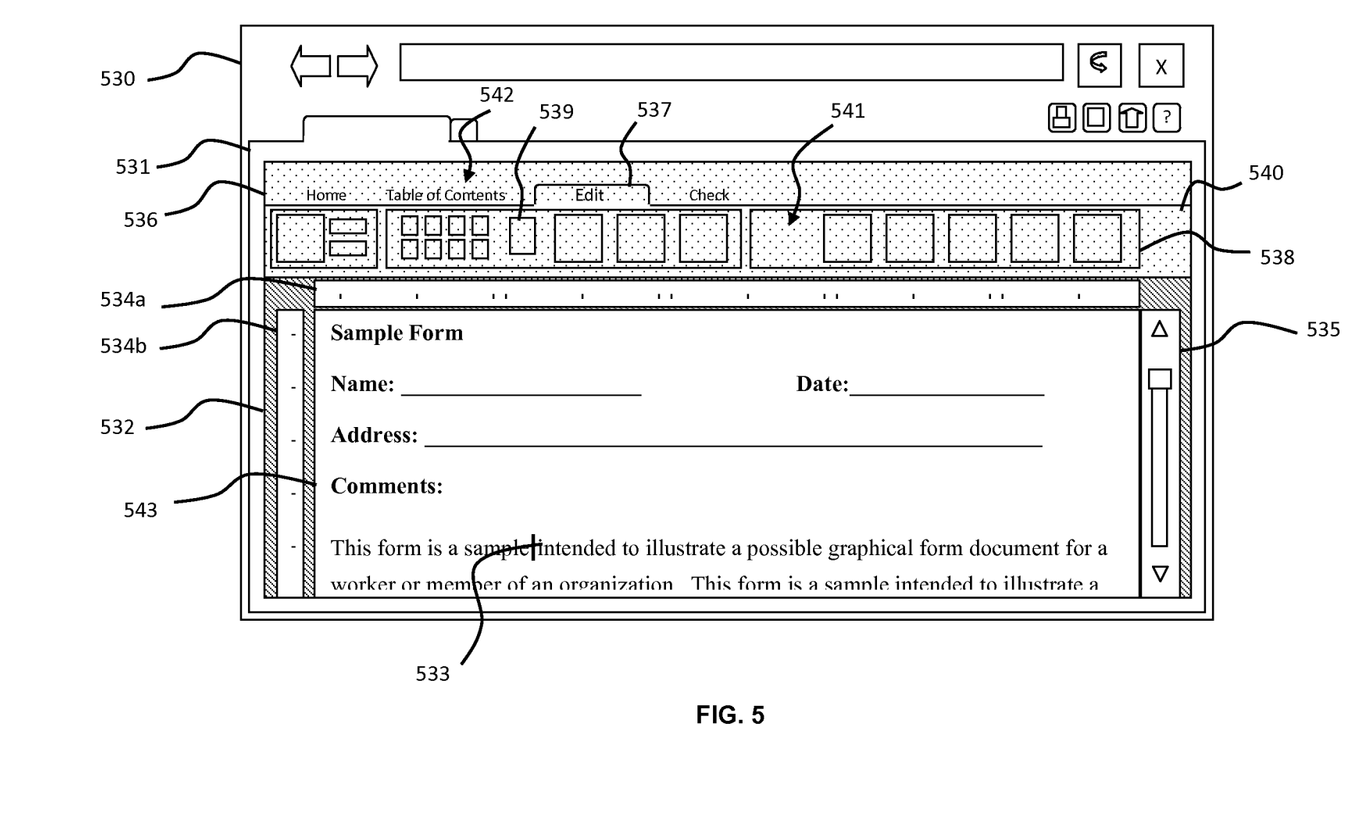
FIGS. 5 and 6 illustrate example screen representations of user interfaces of thin clients of embodiments of the invention.

FIG. 5 illustrates an example screen representation of a client user interface implemented by an embodiment of the invention. FIG. 5 includes a web browser 530 that displays a web page 531 that provides a copy of a part of an image of a session of a word processor 532 (striped box), where the copy includes a text entry element 533, ruler elements 534a and 534b, a scrollbar element 535, and a copy of an image of a document 543 opened by the session of the word processor. The ruler elements 534a and 534b may or may not appear on the web page 531. Adjacent to the copy of an image 532 is a toolbar 536 that includes sub-toolbars (i.e. sub-menus), buttons, and menus, where the toolbar 536 is not a part of the image of a session of a word processor.

The toolbar 536 is rendered by a web application typically hosted by a web server. However, a tab 537, sub-toolbar 538, button 539, and menu 540 of the toolbar 536 may be originally from a user interface of the word processor. The web application acts as middleware between the user interface components of the word processor and the representation of these components provided by the toolbar 536. The entire toolbar 536 may be originally from a user interface of the word processor. In the alternative, settings in an executable or a web application may restrict toolbar components (e.g. menus, buttons, etc.) 541 or may add toolbar components that do not occur in the word processor 542.

Figure 6:
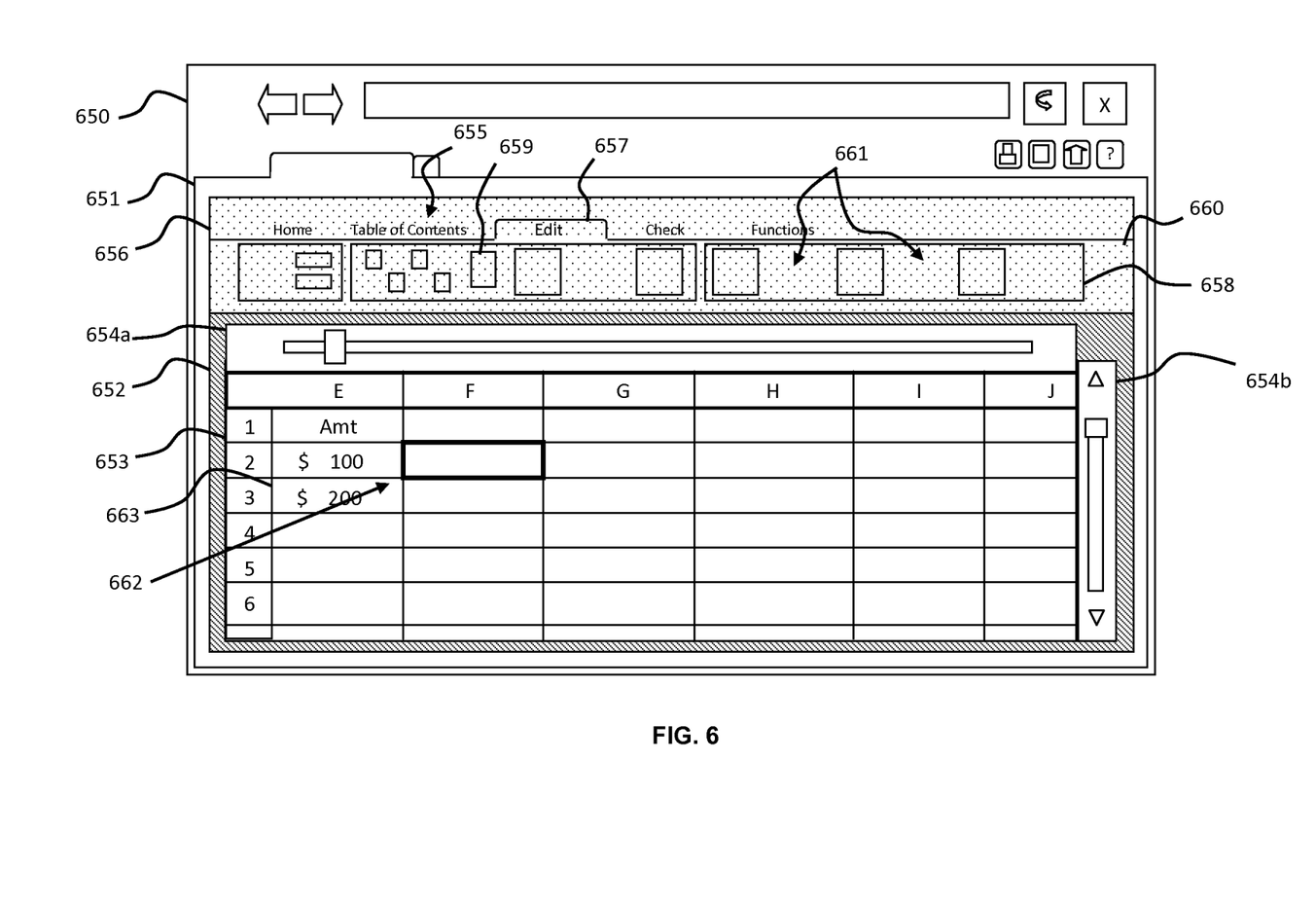

FIG. 6 illustrates another example screen representation of an embodiment of a client user interface implemented by an embodiment of the invention. FIG. 6 includes a web browser 650 that displays a web page 651 that provides a copy of a part of an image of a session of a spreadsheet program 652, where the copy includes a spreadsheet 653, scrollbar elements 654a and 654b, a text entry element 662, and a copy of an image of a spreadsheet document 663 opened by the session of the spreadsheet program. Adjacent to the copy of the image of spreadsheet program 652 is a toolbar 656 that includes sub-toolbars (i.e. sub-menus), buttons, and menus, where the toolbar is not a part of the image of a session of a spreadsheet program.

The toolbar 656 is rendered by a web application typically hosted by a web server. However, a tab 657, sub-toolbar 658, button 659, and menu 660 of the toolbar 656 may be originally from a user interface of the spreadsheet program. The web application acts as middleware between the user interface components of the word processor and the representation of these components provided by the toolbar 656. The entire toolbar 656 may be originally from a user interface of the spreadsheet program. In the alternative, settings in an executable or a web application may restrict toolbar components (e.g. menus, buttons, etc.) 661 or may add toolbar components that do not occur in the spreadsheet program 655.

This invention thus allows any web based thin client HTML application to harness MICROSOFT WORD™ and MICROSOFT EXCEL™ (or other web applications) as part of the application, controlled by the application, and used by the application like a software control. The invention does not simply imbed MICROSOFT WORD™ or MICROSOFT EXCEL™ into a web page and then let the user use MICROSOFT WORD™ or MICROSOFT EXCEL™ and its menus and functions.

Though various embodiments of the present invention have been described above, it should be understood that embodiments have been presented by way of example, and not limitation. A person of ordinary skill in the art will recognize that there are various changes that can be made to the present invention without departing from the spirit and scope of the present invention. Therefore, the invention should not be limited by any of the above-described example embodiments, but should be defined only in accordance with the following claims and equivalents of the claimed invention.

What is claimed:

1. A computer-implemented system for facilitating control over functionality provided by a session of a remote computer application that is provided by remote desktop software, comprising:
   a web application server that hosts a web application that provides a user interface to a thin client, where the user interface comprises a first user interface component that outputs a copy of an image of the session of the remote computer application and a second user interface component that outputs a tool providing functions for interacting with the first user interface component; and
   an executable that facilitates limiting particular elements of the image of the session of the remote computer application provided to the thin client so that the particular elements do not appear in the copy of the image of the session of the remote computer application provided to the thin client and thus do not provide access by the thin client to the functions of the limited particular elements of the image of the session of the remote computer application,
   said tool providing at least one of the functions of the particular elements limited by the executable for interacting with the image of the session of the remote computer application provided to the thin client,
   wherein the remote computer application is a word processor, a database management system, a presentation program, a spreadsheet program, and/or an email and personal information management system, and
   wherein the first user interface component outputs a copy of an image of the session of the remote computer application and the executable restricts or hides a toolbar, menu, items of a toolbar, or items of a menu of the remote computer application and the second user interface component outputs a tool providing functions for providing functions of a toolbar, a menu, one or more items of a toolbar, or one or more items of a menu that are restricted or hidden by said executable.

2. The system of claim 1, where the user interface provided to the thin client is rendered through a web browser that displays a web page that comprises the first user interface that comprises part of the image of the session of the remote computer application where the part of the image is combined with a text entry field, and adjacent to the combination of the part of the image and the text entry field is the tool where the tool is rendered by the web application.

3. The system of claim 1, where the user interface provided to the thin client is rendered through a web browser that displays a web page that comprises the first user interface that comprises an inline frame embedding the image of the session of the remote computer application.

4. The system of claim 1, where a binary-interface standard for software components facilitates the executable communicating with the remote computer application.

5. The system of claim 1, where a cross-platform and language-independent standard for representing and interacting with objects in a document facilitates the thin client user interface communicating with a file interacting with the remote computer application.

6. The system of claim 1, where a set of communication and application protocols and services that provide support for a packet-switched network facilitates communication between the executable, the remote computer application, and the web application.

7. A computer-implemented method for facilitating control over functionality provided by a session of a remote computer application that is provided by remote desktop software, where the method comprises:
   a web application generating a client user interface outputted by a thin client, where the client user interface comprises a first user interface component and a second user interface component, and where the first user interface component outputs a copy of an image of the session of the computer application and the second user interface component outputs a tool providing functions for interacting with the first user interface component;
   an executable facilitating limiting particular elements of the image of the session of the remote computer application provided to the thin client so that the particular elements do not appear in the copy of the image of the session of the remote computer application provided to the thin client and thus do not provide access by the thin client to the functions of the limited particular elements of the image of the session of the remote computer application; and
   said tool providing at least one of the functions of the particular elements limited by the executable for interacting with the image of the session of the remote computer application provided to the thin client, wherein the remote computer application is a word processor, a database management system, a presentation program, a spreadsheet program, and/or an email and personal information management system, and wherein the first user interface component outputs a copy of an image of the session of the remote computer application and the executable restricts or hides a toolbar, menu, items of a toolbar, or items of a menu of the remote computer application and the second user interface component outputs a tool providing functions for providing functions of a toolbar, a menu, one or more items of a toolbar, or one or more items of a menu that are restricted or hidden by said executable.

8. The method of claim 7, where:

the executable and the computer application communicate via a first connection;

the executable and the web application communicate via a second connection;

an operating system facilitates the remote computer application and a file communicating via a third connection, where the file comprises a file user interface and the file is in a format compatible with the remote computer application;

the operating system facilitates the first user interface component and the executable communicating via a fourth connection, where the fourth connection is facilitated by the remote desktop software; and the operating system facilitates the second user interface component and the web application communicating via a fifth connection, where the fifth connection is facilitated by Internet Protocol technologies.

9. The method of claim 7, further comprising rendering the user interface provided to the thin client through a web browser that displays a web page that comprises the first user interface that comprises part of the image of the session of the remote computer application where the part of the image is combined with a text entry field, and adjacent to the combination of the part of the image and the text entry field is the tool where the tool is rendered by the web application.

10. The method of claim 7, further comprising rendering the user interface provided to the thin client through a web browser that displays a web page that comprises the first user interface that comprises an inline frame embedding the image of the session of the remote computer application.

11. The method of claim 7, wherein the executable communicates with the remote computer application via a binary-interface standard for software components.

12. The method of claim 7, wherein the thin client user interface communicates with a file interacting with the remote computer application via a cross-platform and language-independent standard for representing and interacting with objects in a document.

13. The method of claim 7, wherein communication between the executable, the remote computer application, and the web application is provided via a set of communication and application protocols and services that provide support for a packet-switched network facilitates.

14. A system comprising:

a thin client;

a server that comprises a processor that executes computer-executable instructions stored in a computer memory to implement an operating system, a computer application, a web application, and an executable;

a client user interface generated by the web application and outputted by the thin client that comprises a first user interface component and a second user interface component, where the first user interface component outputs a copy of an image of a session of the computer application session and where the second user interface component outputs a tool providing functions for interacting with the first user interface component;

a first connection enabling communicating between the executable and the computer application;

a second connection enabling communicating between the executable and the web application, where the executable facilitates limiting particular elements of the image of the session of the computer application so that the particular elements do not appear in the copy of the image of the session of the remote computer application provided to the thin client and thus do not provide access by the thin client to the functions of the limited particular elements of the image of the session of the remote computer application, and said tool providing at least one of the functions of the particular elements limited by the executable for interacting with the image of the session of the remote computer application provided to the thin client;

a third connection enabling communicating between the computer application and a file, where the file comprises a user interface and the file is in a format compatible with the computer application;

a fourth connection enabling communicating between the first user interface component and the executable, where the fourth connection is enabled by remote desktop software; and a fifth connection enabling communicating between the second user interface component and the web application, where the fifth connection is enabled by Internet Protocol technologies; wherein:

the executable communicates with the computer application through the first connection;

the executable communicates with the web application through the second connection;

the operating system facilitates the computer application in communicating with the document through the third connection;

the operating system facilitates the first user interface component in communicating with the executable through the fourth connection; and the operating system facilitates the second user interface component in communicating with the web application through the fifth connection, wherein the remote computer application is a word processor, a database management system, a presentation program, a spreadsheet program, and/or an email and personal information management system, and wherein the first user interface component outputs a copy of an image of the session of the remote computer application and the executable restricts or hides a toolbar, menu, items of a toolbar, or items of a menu of the remote computer application and the second user interface component outputs a tool providing functions for providing functions of a toolbar, a menu, one or more items of a toolbar, or one or more items of a menu that are restricted or hidden by said executable.

15. The system of claim 14, where the user interface provided to the thin client is rendered through a web browser that displays a web page that comprises the first user interface that comprises part of the image of the session of the remote computer application where the part of the image is combined with a text entry field, and adjacent to the combination of the part of the image and the text entry field is the tool where the tool is rendered by the web application.

16. The system of claim 14, where the user interface provided to the thin client is rendered through a web browser that displays a web page that comprises the first user interface that comprises an inline frame embedding the image of the session of the remote computer application.

17. The system of claim 14, where a binary-interface standard for software components facilitates the executable communicating with the remote computer application.

18. The system of claim 14, where a cross-platform and language-independent standard for representing and interacting with objects in a document facilitates the thin client user interface communicating with a file interacting with the remote computer application.

19. The system of claim 14, where a set of communication and application protocols and services that provide support for a packet-switched network facilitates communication between the executable, the remote computer application, and the web application.

\* \* \* \* \*